Feb. 22, 1966          H. P. KALMUS          3,237,105
PERSONNEL INTRUSION DETECTING DEVICE
Filed May 9, 1962          2 Sheets-Sheet 1
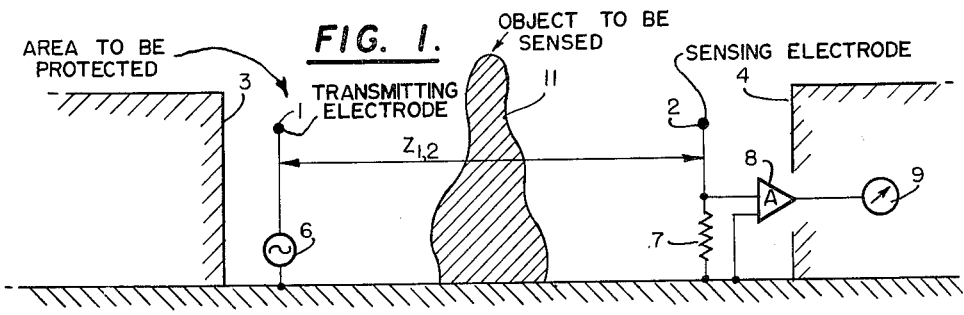
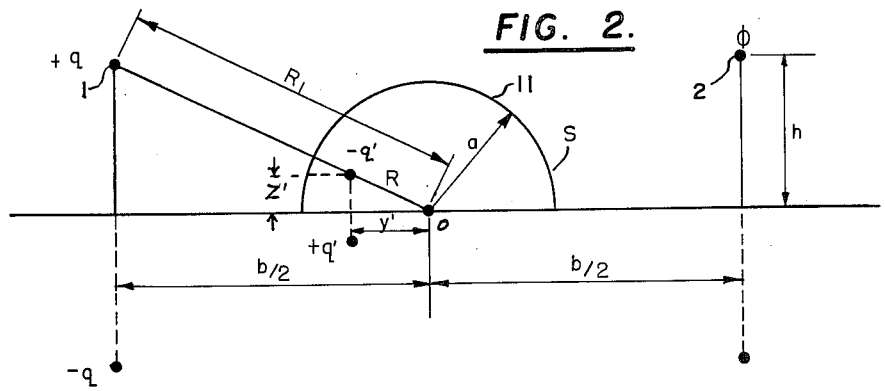
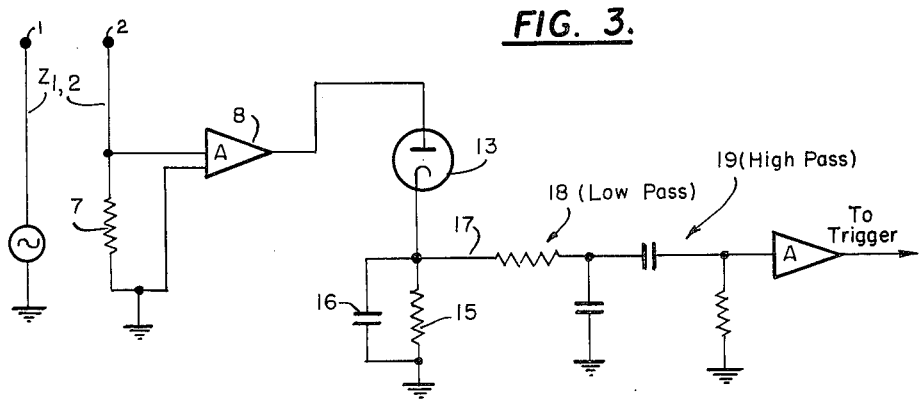
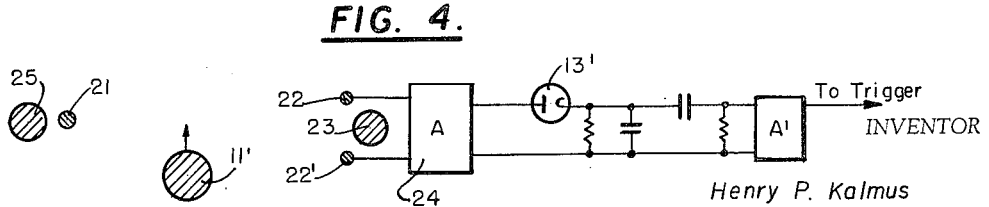
INVENTOR
Henry P. Kalmus
BY *Max L. Libman*
ATTORNEY United States Patent Office 3,237,105
Patented Feb. 22, 1966

3,237,105
PERSONNEL INTRUSION DETECTING DEVICE
Henry P. Kalmus, 3000 University Terrace NW.,
Washington, D.C.
Filed May 9, 1962, Ser. No. 193,407
7 Claims. (Cl. 325—29)

This invention relates to a personnel intrusion detecting device for indicating the presence of persons or objects passing through a predetermined area such, for example, as a gateway. The invention is particularly useful for protection of outdoor areas and particularly to protect an open gateway in a fence by giving a reliable signal upon the passage of any vehicle or person through the gate.

The primary purpose of the invention is to provide a relatively simple and inexpensive device of this type which is substantially maintenance free, and which inherently produces a very large signal in response to a body being detected, in comparison with the signals produced by other prior art devices of a similar nature.

The use of photocells and light beams for guarding gates or other areas is well known, but light-beam systems have two drawbacks: first, the protected area is limited so that a vertical array of light beams would be required to detect objects of various sizes; secondly, devices of this kind are not maintenance free because of the need for occasional replacement of the light source.

High-frequency transmission lines have been employed, but such devices are unsuitable in most areas because of the interference with radio and other communications. Acoustic devices do not have this drawback, but because of the multiple reflections involved, very small objects within or even outside of the critical area often give false alarms.

The present invention employs a low-frequency quasi-stationary field having a geometrical distribution such that it can readily be made to respond very reliably to the presence of an object of a desired size or range of sizes, such as a man or larger object, but will not be affected by a small object such as a cat or smaller animal, and will also not be affected by any ordinary changes in ambient conditions due to natural causes, to which the system should not respond. Low-frequency fields of different arrangements and distribution have been utilized for this purpose, but the field distribution and arrangement have been of such nature that the presence of a foreign body in the local field area could produce only extremely small changes in the circuit, requiring delicate bridge methods to be employed to detect any unbalance in a low-frequency network, due to a passing or nearby object. This is necessary in order to measure the very small change of capacitance which is involved in such systems. In order to measure such small variations, it becomes necessary to maintain an excessive stability of the bridge, and it is very difficult to keep the circuit independent of environmental changes. Efforts to maintain such independence have resulted in very complex self-regulating circuitry, which is both expensive to install and difficult to maintain.

The system of the invention eliminates the requirement for delicate bridge systems which must be balanced, by causing the intruding body itself to introduce a capacity effect on the total capacity effect of the system, making the body itself a substantial element in a four-pole network employed to detect the presence of an object. The object is used to reduce the transfer impedance between the generator and a load circuit in such a manner that it does not produce merely a minute variation of the capacity between the terminals of the detection system, but instead produces a very large effect.

The present invention has the further advantage that its power requirements are very low, so that it can be powered by local dry cells which will be effective for substantially their shelf life. Furthermore, the power required is so low that exposed electrodes can be used without danger due to people or animals coming into contact with the exposed electrodes.

The specific nature of my invention, as well as other objects and advantages thereof, will clearly appear from a description of a preferred embodiment as shown in the accompanying drawings, in which:

FIG. 1 is a schematic block diagram showing the principle of the invention;

FIG. 2 is a geometrical diagram used in explaining the principle of the invention;

FIG. 3 is a block diagram of the invention showing an additional refinement;

FIG. 4 is a combined block diagram and plan view of a modified installation according to the invention for producing a more localized area of sensitivity.

Figure 5:
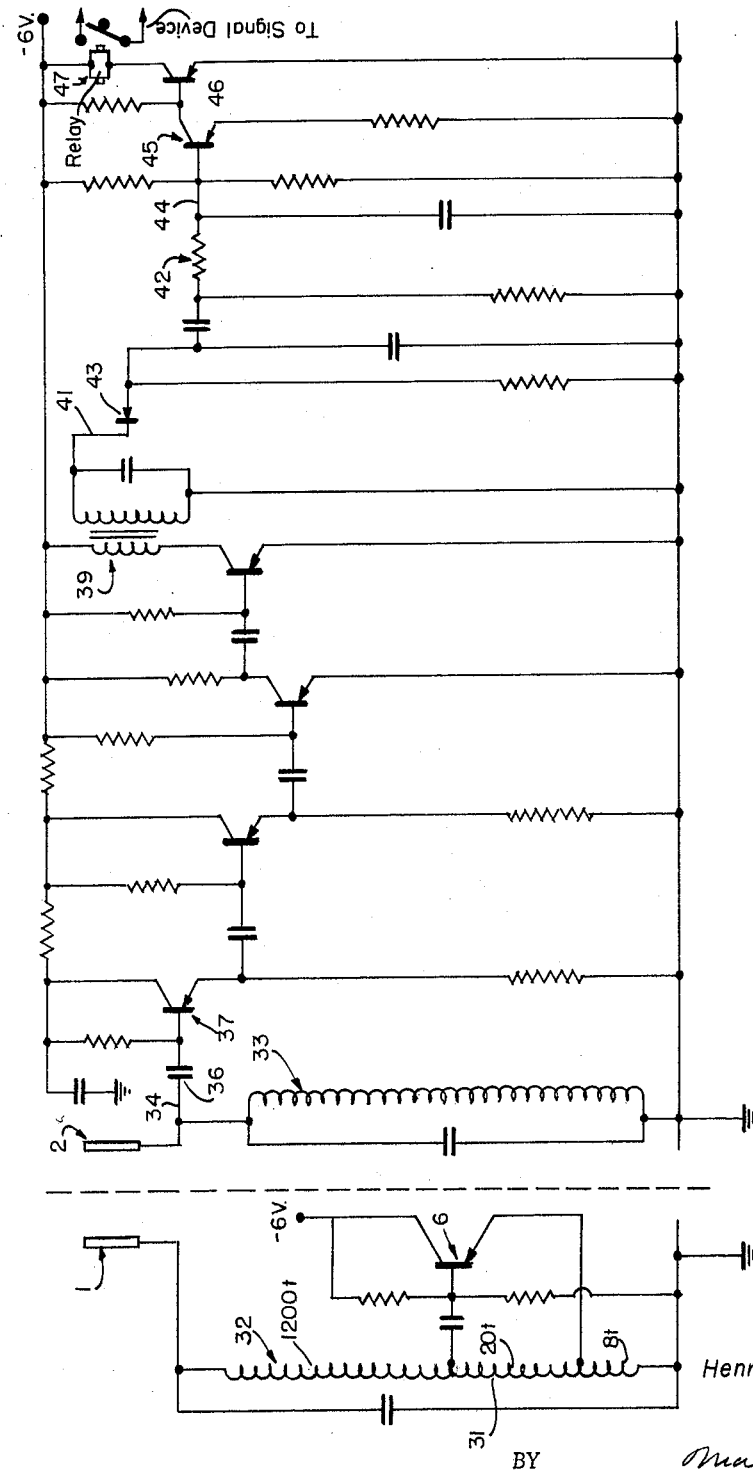
FIG. 5 is a detailed schematic view of the circuit diagram in accordance with the invention.

Referring to FIG. 1, a transmitting electrode 1 and a sensing electrode 2 are set up as shown, slightly spaced from the sides 3, 4 respectively of a gateway, which may be established in a fence, in a wall, or may merely be an arbitrary area across a roadway, where it is decided to obtain an indication of the presence of anyone passing along the road.

A relatively low frequency voltage, which may be between 5 and 100 kc. in frequency, is produced by generator 6 connected between ground and electrode 1. Electrode 2 is connected to ground through resistor 7 and feeds a signal through amplifier 8 to the meter 9. Object 11 represents the bulk of an intruder located between the points 1 and 2. In the absence of object 11, there exists a certain transfer-impedance $Z_{1,2}$ (which is capacitive) between the points 1 and 2. The presence of object 11 increases this impedance by a high percentage so that the presence of the target can easily be detected. This results from the field geometry of the system and the relative size of object 11 with respect to the height and spacing of points 1 and 2.

Although it is very difficult to obtain an exact mathematical solution showing the precise effect of bodies 11 of different size on the system, it is rather easy to present an approximation which makes a good evaluation of the system possible. Referring to FIG. 2, generator 6 and electrode 1 are replaced by the point charge plus $q$. The potential is assumed to be concentrated at point 2. As a final approximation, the object 11 is assumed to be in the form of a hemisphere S. The problem can now be solved by the conventional method of images, to which there are many standard references, for example, Jeans, J., "The Mathematical Theory of Electricity and Magnetism," Cambridge at the University Press, 1951 (5th Ed.), page 189.

The potential existing at point 2 without the target is designated $\phi$. If $\Delta\phi$ is the change of this potential due to the presence of S, then, at a point on the line between the center (O) of the assumed hemisphere S and point 1 (where charge $q$ is assumed to be concentrated), there will be a charge $-q'$. The two following equations describing the geometry of this condition are taken from Jeans above, or may be found in other standard texts:

(1) $$-q' = -q\frac{a}{R_1} = -q\frac{a}{\sqrt{\left(\frac{b}{2}\right)^2 + h^2}}$$

(2) $$R = \frac{a^2}{R_1} = \frac{a^2}{\sqrt{\left(\frac{b}{2}\right)^2 + h^2}}$$

From the similar right triangles, we obtain (3) $$Z' = \frac{hR}{R_1} = h \frac{\frac{a^2}{\sqrt{\left(\frac{b}{2}\right)^2 + h^2}}}{\sqrt{\left(\frac{b}{2}\right)^2 + h^2}}$$

$$= \frac{ha^2}{\left(\frac{b}{2}\right)^2 + h^2} = hA$$

where $$A = \frac{R}{R_1}$$

Similarly, (4) $$y' = \frac{b}{2}\left(\frac{R}{R_1}\right) = \frac{bA}{2}$$

In the absence of the sphere S, i.e., no intruding body present, the total potential existing at point 2 is equal to the charge at point 1 ($q$), divided by the distance between points 1 and 2, and the charge at the mirror image of point 1 ($-q$), divided by the distance between point 2 and this mirror image.

(5) $$\phi = \frac{q}{b} - \frac{q}{\sqrt{4h^2 + b^2}}$$

$$= \frac{q}{b}\left[1 - \frac{1}{2\sqrt{\frac{h^2}{b^2} + \frac{1}{4}}}\right]$$

The effect on the potential at point 2 due to S is:

(6) $$\Delta\phi = \frac{-qa}{\sqrt{\left(\frac{b}{2}\right)^2 + h^2}}\left[\frac{1}{\sqrt{(h-Z')^2 + \left(\frac{b}{2}+y'\right)^2}} - \frac{1}{\sqrt{(h+Z')^2 + \left(\frac{b}{2}+y'\right)^2}}\right]$$

(7) $$\frac{\Delta\phi}{\phi} = -\frac{\frac{a}{b}}{\sqrt{\frac{h^2}{b^2}+\frac{1}{4}}-\frac{1}{2}}\left[\frac{1}{\sqrt{\frac{h^2}{b^2}(A-1)^2 + \frac{(A+1)^2}{4}}} - \frac{1}{\sqrt{\frac{h^2}{b^2}(A+1)^2 + \frac{(A+1)^2}{4}}}\right]$$

For the case where $$\frac{h}{b} = \frac{1}{2}$$

which is a convenient ratio in practice:

(8) $$\frac{\Delta\phi}{\phi} = -\frac{\frac{4a}{b}}{\sqrt{2}-1}\left[\frac{1}{(A-1)^2+(A+1)^2} - \frac{1}{\sqrt{2}(A+1)}\right]$$

It is now possible to compute $\Delta\phi/\phi$ for different sphere radii.

For $a/b = 0.2$, $A = 0.08$.

$$\frac{\Delta\phi}{\phi} = 0.13 \qquad (A)$$

For $a/b = 0.4$, $A = 0.32$ $$\frac{\Delta\phi}{\phi} = 0.54 \qquad (B)$$

This means that for a small target (case A above), a potential variation in the order of 13 percent is obtained. For a larger target (case B), the variation may be in the order of 50 percent. These approximate results have in general been confirmed by experiments with acutal apparatus. In an actual set-up, where the two electrodes 1 and 2 consisted of two vertical thin rods with a length of three feet, set eight feet apart, with a human body between them the meter 9 of FIG. 1 shows a decrease in its reading of 45 percent. Although such a decrease is easily detectable, it is advantageous to build the instrument in such a way that the reading corresponding to $\phi$ is neglected and only the variations in $\phi$ are amplified. This can be done by rectifying the amplifier output, by introducing an appropriate frequency selection for the detected envelope, and by amplification of the envelope. A circuit for this is shown in FIG. 3.

In this case, the output of amplifier 8 is supplied to a diode 13 in series with resistor 15 and bypass condenser 16. The carrier envelope on line 17 is supplied to a network consisting of a lowpass filter 18 followed by a highpass filter 19, designed to provide a bandpass filter. Experiments with the apparatus have shown that in order to detect the presence of a person moving as slowly as possible through the gateway at one extreme, or running as rapidly as possible at the other extreme, a response of from 2 to 20 cycles is needed. By designing the bandpass filter 18, 19 for this range, very good discrimination against spurious signals can be obtained. The output of the network is further amplified at 21, and this amplified output can then be employed to trigger any acoustical or optical signaling device.

With the apparatus of FIG. 3, a range of 15 feet can easily be obtained. If a larger range is to be protected, a chain of electrodes can be arranged whereby one transmitter simultaneously serves two receivers disposed on opposite sides of it.

The practical range of sensitivity of the system shown in FIGS. 1 and 3 is approximately the locus of a circle having the distance between 1 and 2 as its diameter. In some applications, it is desired to have sensitivity of the device more closely restricted to the actual line between 1 and 2, so that a person will not trigger the device unless he is actually passing through the gateway. An arrangement for accomplishing this, which also has the advantage of increase of sensitivity, is shown in FIG. 4. In this case, assuming that the gate posts of the area to be protected are represented by 25 and 23, the transmitting electrode is shown at 21, similar to the previous arrangement. Instead of a single sensing electrode, however, two sensing electrodes, 22 and 22' are employed, set a small distance apart and on either side of the gate post 23. It will be understood that the gate post may actually be the vertical edge of a well, fence, etc. Electrodes 22 and 22' are symmetrically located with respect to gate post 23 and also with respect to transmitting electrode 21, so that spacial neutralization is obtained, i.e., no signal will exist between 22 and 22' in the absence of a disturbing object. If, however, a disturbing object 11' moves in the direction of the arrow through the gate, an unbalance is created. The signal will rise as the object passes through the gate, pass very rapidly through zero and rise again before the target passes away from the gate. The output of amplifier 24 is detected at 13', similar to the arrangement of FIG. 3, but the network is in this case adjusted for differentiation. The time constant of the network is made very short so that a very strong input signal to amplifier 27 is produced through the zero-passing period. The sensitivity of the device is therefore at a maximum for the region directly between the gateposts, and will be very little affected by the presence of the intruding object until it is actually within this area. The arrangement of FIG. 1, on the other hand, is triggered by an object approaching the gate, even before it enters the gate, which in some circumstances is also desirable.

A further improvement of the three-electrode method of FIG. 4 is possible by replacing diode 13' by a phase-sensitive detector. The signal to amplifier 24 undergoes a phase reversal while the target passes through the gate. If, therefore, the transmitter signal itself is used as a reference for the phase-sensitive detector, the detector output will go from a, say, positive value through zero to a negative value. This feature makes it possible to employ efficient noise-rejecting methods in the trigger circuit to still further discriminate against false alarm situations.

Although the arrangement of FIG. 4 shows one transmitting antenna and two receiving antennas, it will be understood by the reciprocity principle that instead two transmitting electrodes and one receiving electrode could be used with exactly the same effect. In this case, of course, the transmitting electrodes are made the terminations of the transmitting circuit so that they are of respectively opposite polarity at any given instant and produce a zero net effect on the receiving antenna under balanced conditions. However, the presence of an intruder in the protected area causes an unbalance as before, and thus produces an indication in the receiving circuit.

FIG. 5 shows a practical transistorized circuit according to the invention. Transmitter electrode 1 is supplied by transistorized generator 6, which may be in a conventional oscillator circuit. However, in order to obtain high voltage output from a low voltage D.-C. battery (required if the device is to be self-contained), the output of the tank circuit 31 of the oscillator is stepped up, which may conveniently be done by means of an auto-transformer arrangement as shown at 32, having a large number of additional turns in order to provide the desired increased voltage.

The field signal from the transmitting electrode is received at electrode 2, utilizing a tuned circuit 33 tuned to the same frequency as the transmitting circuit. The signal is transmitted from line 34 through condenser 36 to any conventional amplifier, here shown as an emitter follower, to further stages of amplification. The output of the final stage is taken through the primary of transformer 39 to the stepped-up secondary circuit, which is tuned to the transmitter frequency for further increase in sensitivity. The output on line 41 is passed through rectifier 43, corresponding to filter 18, 19 in FIG. 3. The output on line 44 is then given two further stages of amplification at 45 and 46, after which the signal is adequate to operate any conventional relay 47 to actuate any suitable desired alarm device. By using transistor circuitry as shown, the device may be made reliably trouble-free, requiring practically no maintenance, and only a negligible amount of power, which can readily be furnished by local batteries to provide safety under all conditions of electric service. It will be noted that by providing the power from a few ordinary flash-light cells, the transmitter is made independent of any wiring to a central source, which greatly simplifies installation. The drain on the batteries is so small that the transmitter will remain operative during the normal shelf life of the batteries.

While the transmitting and receiving antennas have been shown as vertically disposed with respect to the ground, it is also possible to arrange them horizontally at a suitable height, the important consideration being that each electrode is on an opposite side of the area to be protected, with this area between them, so that the object being detected passes through a direct line between the two antennas.

It will be apparent that the embodiments shown are only exemplary and that various modifications can be made in construction and arrangement within the scope of my invention as defined in the appended claims.

I claim:

1. An intrusion warning system of the capacitive type for indicating the presence of an intruder in a given unobstructed area comprising a single transmitting electrode on one side of the given area to be protected, an electric oscillator circuit connected between said electrode and ground for producing a quasi-stationary field between said electrode and ground; a single receiving electrode on the other side of the area to be protected so arranged that an object traversing said area passes through a direct line between said two electrodes; said oscillator circuit operating at a wave length which is very large compared to the distance between the electrodes; signal amplifying means connected to said receiving electrode for amplifying quasi-stationary field signals received from said transmitting electrode, and direct indicating means for detecting and indicating changes in the received quasi-stationary field signals due to an intruding body in said area.

2. The invention according to claim 1, said last means including detector circuit means producing a signal indicative of the envelope shape of received signals, and bypass means responsive to signals in the range of 2 to 20 cycles for said envelope for producing an indication of the motion of a body in said area.

3. The invention according to claim 1, and a second receiving electrode spaced from said single transmitting electrode by substantially the same distance as said single receiving electrode, and spaced from said single receiving electrode by a very small fraction of that distance, said signal amplifying means being differentially connected to both electrodes to amplify only the difference in signals received by said electrodes.

4. The invention according to claim 1, said oscillator circuit providing a frequency output in the range of 5–100 kc.

5. The invention according to claim 4, the output of said oscillator circuit being coupled to said transmitting electrode through a transformer-coupled tank circuit providing a high step-up ratio to increase the voltage supplied to the transmitting electrode.

6. The invention according to claim 1, said signal amplifying means including a bandpass filter having a range in the order of 2–20 cycles for passing only the low frequency component of the detected signal due to movement of an intruder in the given area.

7. The invention according to claim 1, the height and spacing of said electrodes being of the same order of magnitude as an intruding body to be detected.

References Cited by the Examiner

UNITED STATES PATENTS

| 2,197,028 | 4/1940 | Wolff | 340—258 |
| 2,649,538 | 8/1953 | Marlowe et al. | 340—258 |
| 2,656,527 | 10/1953 | Tillman | 340—258 |
| 2,660,718 | 11/1953 | Summerhayes et al. | 240—258 |

FOREIGN PATENTS 704,779    3/1954    Great Britain.

OTHER REFERENCES

Bagno: Electronics, Sept. 16, 1960, pp. 65–67.

DAVID G. REDINBAUGH, *Primary Examiner.*

J. W. CALDWELL, *Assistant Examiner.*